United States Patent Office 3,639,296
Patented Feb. 1, 1972

3,639,296
ANTISTATIC COMPOSITIONS AND METHOD OF RENDERING TEXTILES ANTISTATIC
Herbert Frotscher, Langenfeld, Rhineland, and Manfred Petzold, Dusseldorf-Holthausen, Germany, assignors to Henkel & Cie GmbH, Dusseldorf-Holthausen, Germany
No Drawing. Filed Dec. 26, 1967, Ser. No. 693,077
Claims priority, application Germany, Jan. 13, 1967, H 61,551
The portion of the term of the patent subsequent to Oct. 16, 1984, has been disclaimed
Int. Cl. C08g 23/00
U.S. Cl. 260—2 R     9 Claims

ABSTRACT OF THE DISCLOSURE

A novel method of providing fabrics made partially or entirely of synthetic fibers with wash resistant and dry cleaning resistant antistatic finish and the fabrics produced thereby and novel compositions used in said process. Said compositions are condensation products of (A) an amine with (B) a di- and/or polyhalohydrin ether of a di- or polyalcohol, at least one of (A) and (B) being at least partially substituted with a lipophilic radical of 8 to 22 carbon atoms.

PRIOR ART

It is known to provide textile fabrics with wash resistant and dry cleaning resistant antistatic finishes by by treating the said fabric or material with water-soluble, hardenable condensates of polyamines substituted on the nitrogen atoms with polyalkyleneoxide and compounds having more than one epoxide and/or halohydrin groups therein as can be seen from U.S. Pat. No. 3,347,803. However, it has been found that textiles treated with these condensates have the disadvantage of absorbing dirt dispersed in the dry cleaning solvent, particularly in the presence of small amounts of water and a cleaning intensifying agent, after a few cleanings thereby causing the material to lose whiteness, i.e., tattletale grayness.

OBJECTS OF THE INVENTION

It is an object of the invention to provide novel compositions for imparting improved wash resistant, dry cleaning resistant antistatic finishes on textile materials.

It is another object of the invention to provide a novel method of making textile materials antistatic.

It is a further object of the invention to provide novel textile materials comprised at least partially of synthetic material made antistatic.

These and other objects and advantages of the invention will become obvious from the following detailed description.

THE INVENTION

The novel compositions of the invention are water-soluble or water-dispersible, hardenable condensation or resinous products having hydrogen atoms bonded to an amino nitrogen atom and halohydrin ether groups in a ratio of 1:0.6 to 1:1.5 and containing at least one lipophilic radical of 8 to 22 carbon atoms, said condensation product being formed by reacting at a temperature of about 50 to 120° C. (A) at least one compound selected from the group consisting of ammonia, primary monoamines and polyamines having at least 2 replaceable amino hydrogen atoms and (B) at least one compound selected from the group consisting of di- and/or poly halohydrin ethers of di- and polyalcohols of 2 to 6 carbon atoms and adducts thereof with 1 to 2 moles of a lower alkylene oxide, at least one of (A) and (B) being at least partially substituted with a lipophilic radical of 8 to 22 carbon atoms.

The said condensation products are applied in aqueous solutions or dispersions to textiles and then hardened to obtain textiles having an antistatic finish which is laundry proof and dry cleaning proof.

The condensation products can be prepared in known manner by reacting the nitrogen compound of group A with the halohydrin of group B at elevated temperatures of 50 to 120° C. in the optional presence of water, organic solvents and acid binding agents, in the desired ratio.

To effect cross-linking during the condensation of the hardening step, specific relations of the number of reactive groups per molecule and components reacting with one another have to be adhered to (Flory, Principles of Polymer Chemistry, Chap. IX). Cross-linking will occur in the condensates of the invention, for example, when an amino compound having at least 2 reactive hydrogen atoms attached to a nitrogen atom per molecule is reacted with a halohydrin ether compound containing at least 3 halohydrin groups per molecule or when the ratio of the said reactants is reversed. Corresponding monofunctional compounds can be additionally used in the condensation provided the portion thereof is not greater than an equivalent amount of the poly-functional compound.

The degree of reaction is advantageously controlled by determining the amount of halogen ions formed in the reaction or by an increase in viscosity. The hardenable condensation product should have 20 to 90%, preferably 50 to 70%, of amino hydrogen atoms and the halohydrin groups in the starting compounds reacted together. The reaction automatically terminates when the pH falls below 7 due to acid produced by the reaction or acid added thereto.

Examples of suitable nitrogen containing compounds for the condensation of the invention are ammonia; primary amines such as ethylamine, isopropylamine, cyclohexylamine, monoethanolamine, hydroxyethoxyethylamine, etc.; polyamines having at least two reactive hydrogen atoms attached to a nitrogen atom such as ethylenediamine, diethylenetriamine, dipropylenetriamine, triethylene tetraamine, 1,4-phenylene diamine, 1,4-diaminocyclohexane, piperazine, polyethylene imines with a molecular weight of 150 to 3000, condensates of ammonia and/or amines with epichlorohydrin, condensates of tetraethylenepentaamine with 1 to 2 moles of ethylene oxide or propylene oxide, etc. The said nitrogen containing compounds can be admixed with secondary monoamines provided that the mixture contains an average of at least 1.5 reactive hydrogen atoms attached to a nitrogen atom per mole of reactant.

Examples of suitable halohydrin ether compounds for the condensation of the invention are di- and polyhalohydrin ethers of di- and polyalcohols of 2 to 6 carbon atoms such as di-, tri- and tetra- 1,2-chlorohydrin ethers derived from 1,2-glycols, 1,3-glycols, glycerin, sugar alcohols, i.e., mannite or sorbite, pentaerythrite, halohydrin ethers of adducts of 1 to 2 moles of a lower alkylene oxide such as ethylene oxide with the said alcohols. The halohydrin ethers may contain some monohalohydrin ethers derived from mono- or polyalcohols and these mixtures should contain an average of at least 1.5 halohydrin ether groups per mole of halohydrin ether compounds.

To introduce the lipophilic radical of at least 8 carbon atoms into the condensation products, at least one of the reaction components has to be partly or entirely substituted with such a radical or the introduction of the said radical can occur during the condensation step. Examples of suitable lipophilic radicals are aliphatic, aliphatic-cycloaliphatic and aliphatic-aromatic radicals having 8 to 22, preferably 12 to 18, carbon atoms and they may contain branch chains or double bonds, or be interrupted with oxygen or nitrogen atoms or be substituted with halogen such as fluorine. The degree of substitution of lipophilic radicals is 2 to 65%, preferably 6 to 30%, by weight of the final condensation product.

Examples of suitable mono- or polyamines containing lipophilic radicals are dodecylamine, N-(hydroxyethoxyethyl) - hexadecylamine, N-stearyl - ethylenediamine, N,-N'-didodecyldipropylenetriamine, tetraethylenepentaminestearic acid monoamide, N-acylamidoamines obtainable by aminolysis of natural fats with di- or polyamines, reaction products of fatty alcohol - 1,2 - chlorohydrinethers with mono-, di- or polyamines, addition products of acrylonitrile to primary amines containing lipophilic radicals and subsequent hydrogenation of the nitrile group; esterification products of aliphatic alcohols containing at least 8 carbon atoms with hydroxyalkylamines or polyamines.

Examples of halohydrin ethers containing lipophilic radicals are the bis-chlorohydrin ether of glycerin-monolauryl ether, bis-chlorohydrin ether of pentaerythrite-dicocoalkyl ether, chlorohydrin ether of dodecylalcohol, monochlorohydrin ether of 1,2-dihydroxydecane, etc.

The condensation products are applied from aqueous solutions in the usual manner in padding, dipping or spraying processes. About 0.3–5% by weight of the condensation product, based on the weight of the fibers, are applied onto the textile material.

Due to their excellent affinity to textile fibers, the products are preferably applied by extraction from a long liquor bath. They are readily absorbed at a relatively low temperature of 20°–100° C., preferably 40°–70° C., by the textile fibers even without an addition of any auxiliary agents. The liquor ratio can amount to 1:8 to 1:100. If desired, the extraction behavior can be controlled by the addition of anionic or non-ionogenic wetting agents. For padding or dipping-centrifuging processes or stretching process, the treatment liquor should contain sufficient amount of an acid acceptor to neutralize acid formed. Examples of suitable acid acceptors are alkali metal hydroxides, alkali metal carbonate or bicarbonate or salts of an inorganic base and organic acid, such as sodium acetate. The pH of the liquor containing the acid acceptor should lie between 6 and 11. With regard to a stretching process, it is immaterial if the acid acceptor is added to the treatment liquor before or during the treatment or after the condensation product had been absorbed.

The condensation products of the invention are especially suitable for the treatment of synthetic or semisynthetic textile materials made, for example, from polyamides, polyesters, polyacrylonitrile, polyvinylchloride, acetylcellulose, etc., alone or admixed with natural fibrous materials such as wool, silk or cellulose.

During drying of the treated textile materials, the condensation products are changed or hardened into a high molecular weight, water-insoluble condition. Drying may be effected at room temperature or up to usual drying temperatures, i.e., up to 200° C., used in the textile industry. The time required for hardening decreases in the same degree as the temperature increases.

In the following examples there are described several preferred embodiments to illustrate the invention. However, it should be understood that the invention is not intended to be limited to the specific embodiments.

Example I 180 gm. of triethylene glycol were introduced into a flask equipped with stirrer, thermometer, reflux condenser and dropping funnel and 2.2 gm of a boron trifluoride-acetic acid complex (36% $BF_3$) were added thereto with stirring and the mixture was heated to 70° C. Then, 225 gm of epichlorohydrin were added dropwise and slow enough to maintain the temperature between 68 and 72° C. with moderate external cooling and the mixture was then stirred for 30 minutes at 70°. 39.7 gm of coconut amine having an iodine number of less than 5 and 38 gm of 50% aqueous sodium hydroxide were then added thereto after which the mixture was heated to 95 to 100° C. and held there for 30 minutes. After cooling the mixture to 80° C., 52 gm of dipropylenetriamine in 200 cc. of water was added thereto and the mixture was stirred for 15 minutes at 80° C. after which 200 gm. of isopropanol, 60 gm. of 50% aqueous sodium hydroxide and 50 gm. of water were added thereto. The reaction mixture was again heated to 80–82° C. and stirred at this temperature until 60% of organically bonded chlorine had ionized. Then, a mixture of 35 gm. of 85% formic acid and 80 gm. of cold water were added followed by the addition of 145 gm. of hot water. The reaction mixture was stirred until cooled to obtain a viscous condensation product easily soluble in water.

An undyed fabric made of polyacrylonitrile fibers was treated in a padding machine with a liquor containing 100 gm. of the above condensation product, 15 gm. of sodium bicarbonate and 0.5 gm. of a non-ionic fatty alcohol-ethylene oxide condensate wetting agent per liter of liquor. The treated fabric was squeeze-dried to a solution absorption of about 30 to 40% by weight and then dried on a stretching frame at a temperature of 110–120° C.

The treated sample and an untreated sample were subjected to a dry cleaning operation together with suits with perchloroethylene and a commercial cleaning intensifier in an industrial chemical cleaning plant. After the cleaning process, the treated sample showed a degree of 96% whiteness of the untreated sample. The anti-static properties of the treated sample were excellent even after repeated chemical cleaning and after being washed 20 times with a commercial household detergent at a temperature of 40° C.

Example II 354 gm. of crude diethyleneglycol-bis-chlorohydrin ether were placed into thhe apparatus previously described and then 51 gm. of tallow amine (iodine number=35), 36.2 gm. of 50% aqueous sodium hydroxide and 20 gm. of water were added at a temperature of 70° C. The mixture was heated to 95° C., stirred at this temperature for 60 minutes and then cooled to 80° C. Then, a mixture consisting of 52.8 gm. of dipropylenetriamine and 200 gm. of isopropanol was added thereto with stirring followed by the addition of 67 gm. of 50% aqueous sodium hydroxide and 50 gm. of water. The reaction mixture was heated to 80° to 82° C. and stirred at this temperature until 65% of the organically bonded chlorine had ionized. Finally, 33 gm. of 85% formic acid in 80 gm. of cold water followed by 140 gm. of hot water were added, and the reaction mixture was cold-stirred to obtain a viscous condensation product.

A knit fabric made of textured polyester yarn was treated in a paddle vat at a solution-fabric ratio of 1:30 with a solution which contained 1 gm. of the condensation product described above, 1.5 gm. of sodium acetate and 0.2 gm. of sodium carbonate per liter of liquor. The duration of the treatment was 20 minutes at a temperature of 60° C., after which the material was dried in the usual manner at a temperature of 80°–100° C.

The thus treated sample and an untreated sample were subjected, as described in Example I, to a chemical cleaning process in the presence of the usual goods to be cleaned. After the cleaning process had been completed, the treated sample exhibited a degree of 92% whiteness of that of the untreated sample. The dry cleaned sample and a similarly treated sample were washed 20 times with a commercial household detergent at a temperature of 40° C. and still possessed very good antistatic properties.

Example III 102.5 gm. of crude triethyleneglycol-bis-chlorohydrin ether were placed into the apparatus of Example I and 25.5 gm. of tallow amine (iodine number=10), 18 gm.

of 50% aqueous sodium hydroxide and 10 gm. of water were added thereto at 70° C. The mixture was heated to 92° C. and stirred at this temperature for 60 minutes. After the reaction mixture had been cooled to 75° C., 10.6 gm. of dipropylenetriamine in 75 gm. of water, followed by 75 gm. of ethanol, 15 gm. of 50% aqueous sodium hydroxide and 15 gm. of water were added thereto. Then, the reaction mixture was heated to 82° C. and stirred until 73% of the organically bonded chlorine had ionized. After the pH had been adjusted to below 5.5 by an addition of acetic acid, a second addition of 400 gm. of water thereto resulted in a clear viscous solution.

Polyamide flakes were treated with a solution containing 100 gm. of the condensation product described above and 10 gm. of sodium bicarbonate per liter of solution and was then centrifuged to a 30% solution absorption and finally dried in the usual manner.

The said sample and a sample of untreated material were dry cleaned together after having been sewn into gauze bags together with normally soiled suits. The treated sample showed practically no graying as compared with the untreated sample. After the dry cleaning and repeated washing with a common household detergent, the antistatic effect of the treated sample was good.

Example IV 150 gm. of crude ethyleneglycol-bis-chlorohydrin ether were placed in the apparatus of Example I and then 25.5 gm. of tallow amine (iodine number=25), 17.3 gm. of 50% aqueous sodium hydroxide and 10 gm. of water were added thereto at 75° C. Then, the mixture was heated to 95° C., stirred at this temperature for 45 minutes, and cooled to 70° C. Thereafter, first 20.5 gm. of diethylenetriamine in 100 gm. of water and then 100 gm. of isopropanol, 34 gm. of 50% aqueous sodium hydroxide and 25 gm. of water were added thereto. The mixture was heated to 82° C. and stirred until 60% of the organically bonded chlorine had ionized. After the reaction mixture had been adjusted with aqueous glycolic acid to a pH below 5, it was diluted with hot water to a concentration of 600 gm.

Textured, continuous polyester yarn placed on dye bobbins was dyed in the usual manner with a dispersion dye to a pastel-blue shade, and then was treated in the dyeing apparatus for 20 minutes at a temperature of 60° C. with a solution containing 2 gm. of the condensation product described above, 1.5 gm. of sodium acetate and 0.2 gm. of sodium carbonate per liter at a solution ratio of 1:20. Thereafter, the yarn was centrifuged and dried at room temperature.

From this treated yarn the front part of a pullover sweater was knitted, while the back of the sweater was knitted from an untreated yarn. After both front and back had been sewn together, the sweater was subjected to dry cleaning with a batch of normally soiled knitted goods. After the cleaning, the treated front showed no effect on the color and could not practically be differentiated from the back part in this respect.

Example V

A polyacrylonitrile fabric, which turned slightly yellow in the presence of alkali, was processed on a padding machine with a solution containing 60 gm. of the condensation product of Example I, and 15 gm. of sodium acetate per liter of solution and which had been adjusted with 30% acetic acid to a pH of 6. Then, the fabric was squeeze-dried to about 50% of solution absorption and dried on the stretching frame at a temperature of 120° C. No graying was observed during the normal dry cleaning of the said fabric and the anti-static effect proved to be resistant to dry cleaning and washing.

The following examples will illustrate the preparation of condensation products which can be employed in the described manner for the finishing of textile materials.

Example VI 108.5 gm. of a mixture of about equal parts of mono- and bis-chlorohydrin ethers of an adduct of 2 moles of ethylene oxide and 1 mole of pentaerythrite were placed in the apparatus of Example I and then 45.5 gm. of tetraethylenepentamine-stearic acid monoamide, 350 gm. of 50% aqueous isopropanol and 28 gm. of 50% aqueous sodium hydroxide were added thereto at 80° C. Then the mixture was stirred at a temperature of 84° C. until 75% of the organically bonded chlorine had ionized. After acidifying the reaction mixture with acetic acid to a pH of 4, a clear viscous solution was obtained.

Example VII 204 gm. of triethyleneglycol-bis-chlorohydrin ether were placed in the apparatus of Example I and then a mixture consisting of 6 gm. of N-dodecylpropylenediamine and 29.7 gm. of dipropylenetriamine, 100 gm. of water and 35 gm. of 50% aqueous sodium hydroxide was added thereto at 70° C. Then, the mixture was stirred at a temperature of 90° C. until about 55% of the organically bonded chlorine had ionized and finally, the reaction mixture was adjusted with dilute hydrochloric acid to a pH of 5.3.

Example VIII 170 gm. of triethyleneglycol-bis-chlorohydrin ether together with 60 gm. of ice were placed in a glass autoclave and 22.5 gm. of concentrated ammonium hydroxide, 9.3 gm. of dodecylamine and 55 gm. of 35% aqueous sodium hydroxide were added. After the autoclave had been closed, the mixture was heated with stirring for about 2 hours at 90° C. during which period about 62.5% of the organically bonded chlorine ionized. After the reaction mixture had been cooled, it was adjusted with dilute hydrochloric acid to a pH of 4.5.

Example IX 74.5 gm. of the tris-chlorohydrin ether of the adduct of 2 moles of ethylene oxide with 1 mole of monotallow alkyl ether of pentaerythrite were placed in the apparatus of Example I and 250 gm. of a mixture consisting of 3 gm. of ethylenediamine, 0.6 gm. of ammonia, 125 gm. of isopropanol and 111.4 gm. of water were added thereto at 50° C. and stirred for 1 hour at 50° C. Then, 12 gm. of 50% aqueous sodium hydroxide and 10 gm. of water were added, and the reaction mixture was heated for 2 hours at 80° C. until 55% of the organically bonded chlorine had ionized. After the reaction mixture had been adjusted to a pH below 5 with 10% hydrochloric acid, a clear constant solution of the product was obtained.

Example X 105 gm. of the bis-chlorohydrin ether of the adduct of 2 moles of ethylene oxide with 1 mole of N-tallow alkyl-diethanolamine were placed in the apparatus of Example I and then, 9.3 gm. of dipropylenetriamine, 175 gm. of 50% aqueous ethanol and 16 gm. of 50% aqueous sodium hydroxide were added thereto at 70° C. The mixture was heated to 84° C. and stirred at this temperature until 56% of the organically bonded chlorine had ionized. After the pH had been adjusted to less than 5.2 with 50% aqueous acetic acid, a clear solution of the product was obtained.

Example XI 150 gm. of ethyleneglycol-bis-chlorohydrin ether were placed in the apparatus of Example I and then 50 gm. of the aminopropyl ether of the perfluoro-nonyl alcohol, 17.5 gm. of 50% aqueous sodium hydroxide and 5 gm. of water were added thereto at 70° C. Next, the mixture was heated to 90° C. and stirred at this temperature for 90 minutes. After the mixture had been cooled to 75° C., 26.4 gm. of dipropylenetriamine, 175 gm.

of 50% aqueous ethanol and 45 gm. of 40% aqueous sodium hydroxide were added thereto with stirring. Then the reaction mixture was stirred at a temperature of 84° C. until 52% of the organically bonded chlorine had ionized and finally, the reaction mixture was adjusted to a pH of 3.5 with alcoholic acetic acid.

Example XII 250 gm. of ethyleneglycol-bis-chlorohydrin ether were placed in the apparatus of Example I and 52.5 gm. of aminoethylethanolamine, 32.5 gm. of octyl amine, 300 gm. of water and 38 gm. of 50% aqueous sodium hydroxide were added thereto at 70° C. The mixture was then heated to 95° C. and stirred at this temperature until 60% of the organically bonded chlorine had ionized and then the reaction mixture was acidified to a pH of 5.3 with 10% hydrochloric acid.

Example XIII 65 gm. of the tetra-chlorohydrin ether of the adduct of 2 moles of ethylene oxide with 1 mole of mannitol were placed in the apparatus of Example I and 37 gm. of dodecylamine and 200 ml. of alcoholic 1 N-potassium hydroxide were added thereto at 80° C. The mixture was refluxed for 2 hours and then stirred until it cooled to room temperature, the potassium chloride formed was then filtered off and the reaction mixture was stirred at 80° C. until 55% of the organically bonded chlorine had ionized. Then, the reaction mixture was adjusted to a pH of 4.5 with acetic acid.

Example XIV 157 gm. of the $\gamma$-chloro-$\beta$-hydroxypropyl ether of nonylphenol were placed in the apparatus of Example I, and 66 gm. of dipropylenetriamine and 40 gm. of 50% aqueous sodium hydroxide were added thereto at 70° C. with stirring. The mixture was heated to 100° C. and stirred at this temperature for 30 minutes. Then, the mixture was cooled to 80° C. and 300 gm. of diethyleneglycol-bis-chlorohydrin ether, 300 gm. of 50% aqueous isopropanol and 80 gm. of 50 aqueous sodium hydroxide were added thereto. Then, the mixture was stirred at about 83° C. until 60% of the organically bonded chlorine had ionized. The reaction mixture was adjusted to a pH of 5 with formic acid and the precipitated sodium chloride was filtered off to obtain a viscous condensation product.

Example XV 185 gm. of glycerin-tris-chlorohydrin ether were placed in the apparatus of Example I and 245 gm. of behenylamine and 40 gm. of 50% aqueous sodium hydroxide were added thereto at 70° C. Then the mixture was heated to 95° C. for 90 minutes and after the mixture was cooled to 80° C., 900 gm. of 75% aqueous isopropanol and 10 gm. of 50% aqueous sodium hydroxide were added thereto. The reaction mixture was stirred at 85° C. until 40% of the organically bonded chlorine had ionized and finally, the reaction mixture was adjusted to a pH of 3.8 with acetic acid.

Example XVI 55.5 gm. of the bis-chlorohydrin ether of the adduct of 2 moles of ethylene oxide and 1 mole of glycerin were placed in the apparatus of Example I and 32 gm. of N-tallow alkyl-propylenediamine, 60 gm. of ethanol, 60 gm. of water and 6 gm. of 50% aqueous sodium hydroxide were added thereto at 70° C. The mixture was then stirred at 85° C. until 55% of the organically bonded chlorine had ionized. Thereafter, the reaction mixture was acidified to a pH below 5 with 10% hydrochloric acid and adjusted with water to a final weight of 250 gm.

Various modifications of the process and products of the invention may be made without departing from the spirit or scope thereof and it is to be understood that the invenion is to be limited only as defined in the appended claims.

We claim:

1. A water-soluble or water-dispersible, hardenable condensation product having hydrogen atoms bonded to an amino nitrogen atom and halohydrin ether groups in a ratio of 1:0.6 to 1:1.5 and containing at least one lipophilic radical of 8 to 22 carbon atoms, said condensation product being formed by reacting at a temperature of about 50 to 120° C. (A) at least one compound selected from the group consisting of ammonia, primary monoamines and polyamines having a least 2 replaceable amino hydrogen atoms and (B) at least one compound selected from the group consisting of di- and polyhalohydrin ethers of di- and polyalcohols of 2 to 6 carbon atoms and mixtures thereof and adducts thereof with 1 to 2 moles of a lower alkylene oxide, at least one of (A) and (B) being at least partially substituted with a lipophilic radical of 8 to 22 carbon atoms selected from the group consisting of aliphatic, aliphatic-cycloaliphatic and aliphatic-aromatic and the lipophilic radical being 2 to 65% by weight of the condensation product.

2. A condensation product of claim 1 wherein the lipophilic radical is alkyl of 12 to 18 carbon atoms.

3. A condensation product of claim 1 wherein the lipophilic radical is substituted with fluorine.

4. A condensation product of claim 1 wherein the lipophilic radical is 6 to 30% by weight of the condensation product.

5. A condensation product of claim 1 wherein 20 to 90% of the amino and halohydrin ether groups have been reacted.

6. A condensation product of claim 1 wherein 50 to 70% of the amino and halohydrin ether groups have been reacted.

7. A process for imparting anti-static properties to synthetic organic materials which comprises treating synthetic organic materials with an aqueous alkaline solution of a hardenable condensation product of claim 1 and drying the said organic material.

8. The process of claim 7 wherein the organic material is dried at temperatures up to 200° C.

9. A textile material treated by the process of claim 7.

References Cited

UNITED STATES PATENTS 3,347,803   10/1967   Frotscher et al. _____ 260—2

SAMUEL H. BLECH, Primary Examiner

U.S. Cl. X.R.

8—142; 117—138.8 N, 138.8 F, 138.8 UA, 139.5 A, 145, 161 UN; 252—8.8; 260—2 EN, 2 BP, 18 R, 29.2 N, 823, Dig. 17